(12) United States Patent
Arbaugh et al.

(10) Patent No.: US 7,407,210 B2
(45) Date of Patent: Aug. 5, 2008

(54) CLIMATE CONTROLLED VEHICLE CONSOLE WITH WINDOW

(75) Inventors: Michael Arbaugh, Beverly Hills, MI (US); Craig Metros, Bloomfield, MI (US); Dave Lechkun, Shelby Township, MI (US); Brian Izard, Northville, MI (US); Nicolas Thetard, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 11/615,562

(22) Filed: Dec. 22, 2006

(65) Prior Publication Data

US 2007/0194582 A1  Aug. 23, 2007

Related U.S. Application Data

(60) Provisional application No. 60/753,742, filed on Dec. 23, 2005.

(51) Int. Cl.
    *B60R 27/00* (2006.01)
(52) U.S. Cl. ................... 296/24.34; 296/37.8
(58) Field of Classification Search ............ 296/24.32, 296/37.8, 37.6; 224/926, 539, 281, 275; 62/261
    See application file for complete search history.

(56) References Cited

U.S. PATENT DOCUMENTS

| 3,949,902 | A | * | 4/1976 | Thompson | 296/22 |
|---|---|---|---|---|---|
| 4,809,897 | A | * | 3/1989 | Wright, Jr. | 224/926 |
| 5,338,081 | A | * | 8/1994 | Young et al. | 296/37.8 |
| 5,680,974 | A | * | 10/1997 | Vander Sluis | 296/37.9 |
| 6,045,173 | A | * | 4/2000 | Tiesler et al. | 296/37.8 |
| 6,116,674 | A | * | 9/2000 | Allison et al. | 296/37.8 |
| 6,135,529 | A | * | 10/2000 | De Angelis et al. | 296/37.8 |
| 6,254,160 | B1 | * | 7/2001 | Marriott et al. | 296/24.3 |
| 6,419,314 | B1 | * | 7/2002 | Scheerhorn | 296/37.8 |
| 6,435,587 | B1 | * | 8/2002 | Flowerday et al. | 296/37.8 |
| 6,497,443 | B2 | * | 12/2002 | Worrell et al. | 296/37.8 |
| 6,588,821 | B2 | * | 7/2003 | Worrell et al. | 296/37.8 |
| 6,719,343 | B2 | * | 4/2004 | Emerling et al. | 296/24.34 |
| 7,029,048 | B1 | * | 4/2006 | Hicks et al. | 296/24.34 |
| 7,104,580 | B2 | * | 9/2006 | Clark et al. | 296/24.32 |
| 7,147,280 | B2 | * | 12/2006 | Duerr et al. | 297/188.01 |
| 2003/0122392 | A1 | * | 7/2003 | Larsen et al. | 296/37.8 |
| 2005/0035618 | A1 | * | 2/2005 | Toth et al. | 296/24.34 |
| 2006/0085940 | A1 | * | 4/2006 | Chernoff | 15/313 |
| 2006/0220408 | A1 | * | 10/2006 | Hutek et al. | 296/37.8 |
| 2007/0039477 | A1 | * | 2/2007 | Bowden et al. | 99/279 |
| 2007/0119885 | A1 | * | 5/2007 | Miller et al. | 224/275 |
| 2008/0079278 | A1 | * | 4/2008 | Rajappa et al. | 296/24.34 |

* cited by examiner

*Primary Examiner*—Kiran B. Patel
(74) *Attorney, Agent, or Firm*—Gigette M. Bejin; Dickinson Wright PLLC

(57) ABSTRACT

A vehicle having a climate-controlled console (14) is provided. The vehicle (10) includes a vehicle frame (12) and a console (14) attached to the vehicle frame (12). The console (14) includes a housing (20), a drawer (22), and one or more climate regulators (24). The housing (20) defines a cavity (26). The drawer (22) is slidably attached to the housing (20) and movable into the cavity (26). The drawer (22) includes one or more compartments with a floor portion (38), a lid (36), and a series of wall portions (40) extending between the floor portion (38) and lid. One or more of the wall portions (40) are formed from a transparent material (56) for displaying an interior (58) of the compartment (28). The climate regulators (24) maintain a predetermined climate in the compartment (28).

8 Claims, 4 Drawing Sheets

CLIMATE CONTROLLED VEHICLE CONSOLE WITH WINDOW

CROSS-REFERENCE TO RELATED APPLICATION

This application claims the benefit of prior U.S. Provisional Application Ser. No. 60/753,742, filed on Dec. 23, 2005.

TECHNICAL FIELD

The present invention relates generally to vehicle storage compartments, and more particularly to a climate controlled vehicle console with one or more windows for readily storing and accessing cargo.

BACKGROUND

Existing vehicle interiors typically include a series of storage compartments for storing a variety of items, such as maps, sunglasses, and coins. Certain vehicles include a center console positioned between a pair of front bucket seats. This center console typically is formed from colored or otherwise opaque material. In this respect, the items within the console are visible only when viewed by a direct line of sight through an unobstructed opening of the compartment. For that reason, a vehicle occupant may be required to search through a pile of items within the console before finding the item the occupant wishes to retrieve.

Typical vehicle storage compartments are manually opened or closed. In this way, a vehicle occupant typically pulls open and pushes closed the storage compartment.

It is therefore desirable to provide a climate controlled vehicle console with one or more windows and a series of compartments for readily storing and accessing cargo.

SUMMARY OF THE INVENTION

A vehicle having a climate-controlled console is provided. The vehicle includes a vehicle frame and a console attached to the vehicle frame. The console includes a housing, a drawer, and one or more climate regulator devices. The housing defines a cavity. The drawer is slidably attached to the housing and movable into the cavity. The drawer includes one or more compartments with a floor portion, a lid, and a series of wall portions extending between the floor portion and lid. One or more of the wall portions are formed from a transparent material for displaying an interior of the compartment. The climate regulator device maintains a predetermined climate in the compartment.

One advantage of the invention is that a climate controlled vehicle console is provided that displays its contents and provides easy access to the same.

Another advantage of the invention is that a climate controlled vehicle console is provided that stores its contents at a predetermined climate.

Yet another advantage of the invention is that a climate controlled vehicle console is provided that can store a variety of items in fixed positions.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention.

DETAILED DESCRIPTION OF THE INVENTION

Figures 1, 7:
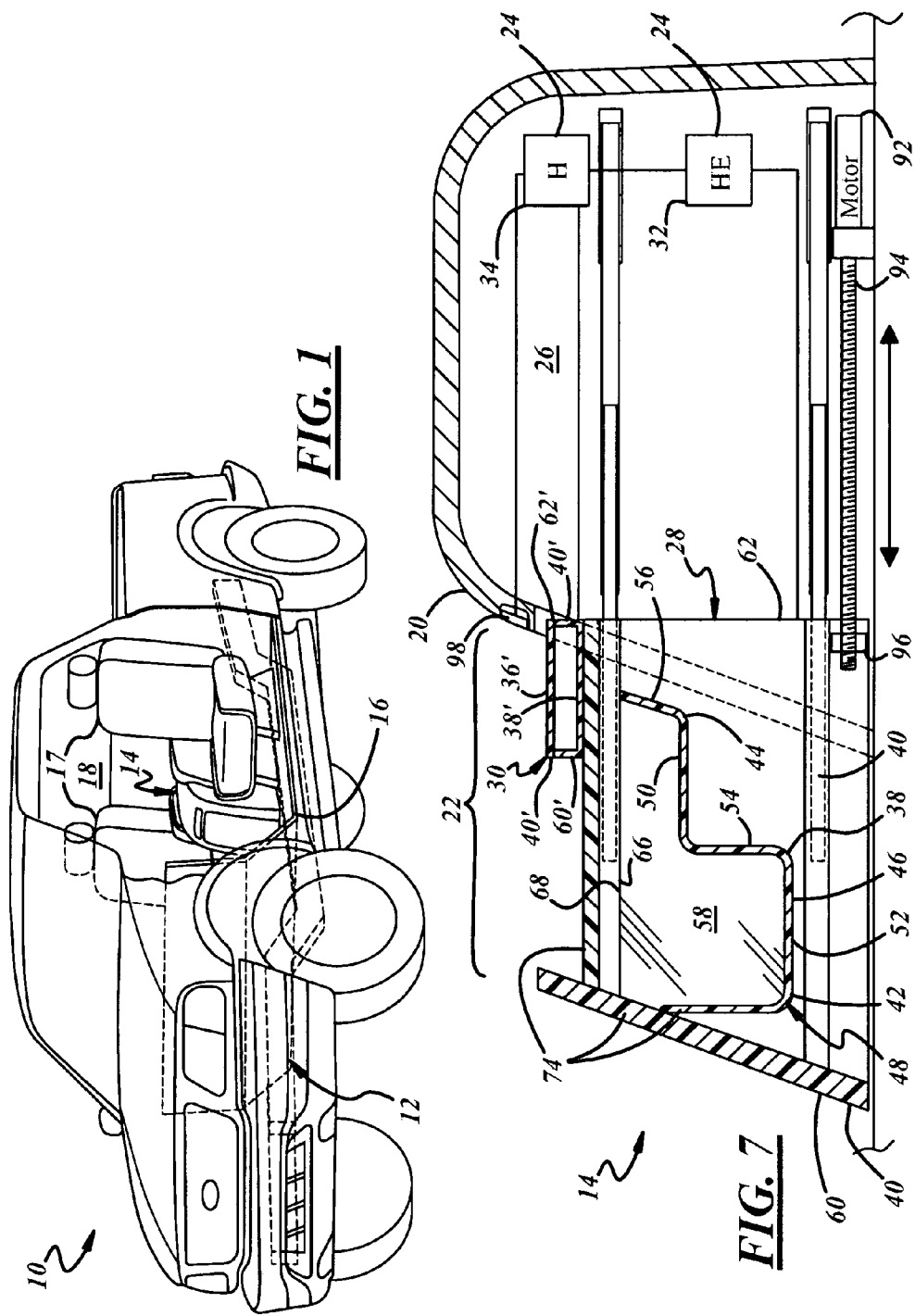
FIG. 1 is a perspective view of a vehicle having a vehicle frame with a climate controlled console, according to one embodiment of the invention.
FIG. 7 is a side cutaway view of the console shown in FIG. 1.

In the following figures, the same reference numerals are used to identify the same components in the various views.

Referring to FIG. 1, there is shown a vehicle 10 having a frame 12 and a climate controlled console 14 ("console"), according to one embodiment of the claimed invention. The frame 12 includes a floorpan 16 for a passenger cabin 18 with the console 14 attached to the floorpan 16 between two second row vehicle seats 17. As detailed below, the console 14 displays its contents for facilitating retrieval of the items stored therein. It will also be appreciated that the console 14 stores items in fixed positions at a predetermined climate. It is contemplated that the console 14 can be attached to a variety of suitable portions of the frame 12.

Figure 2:
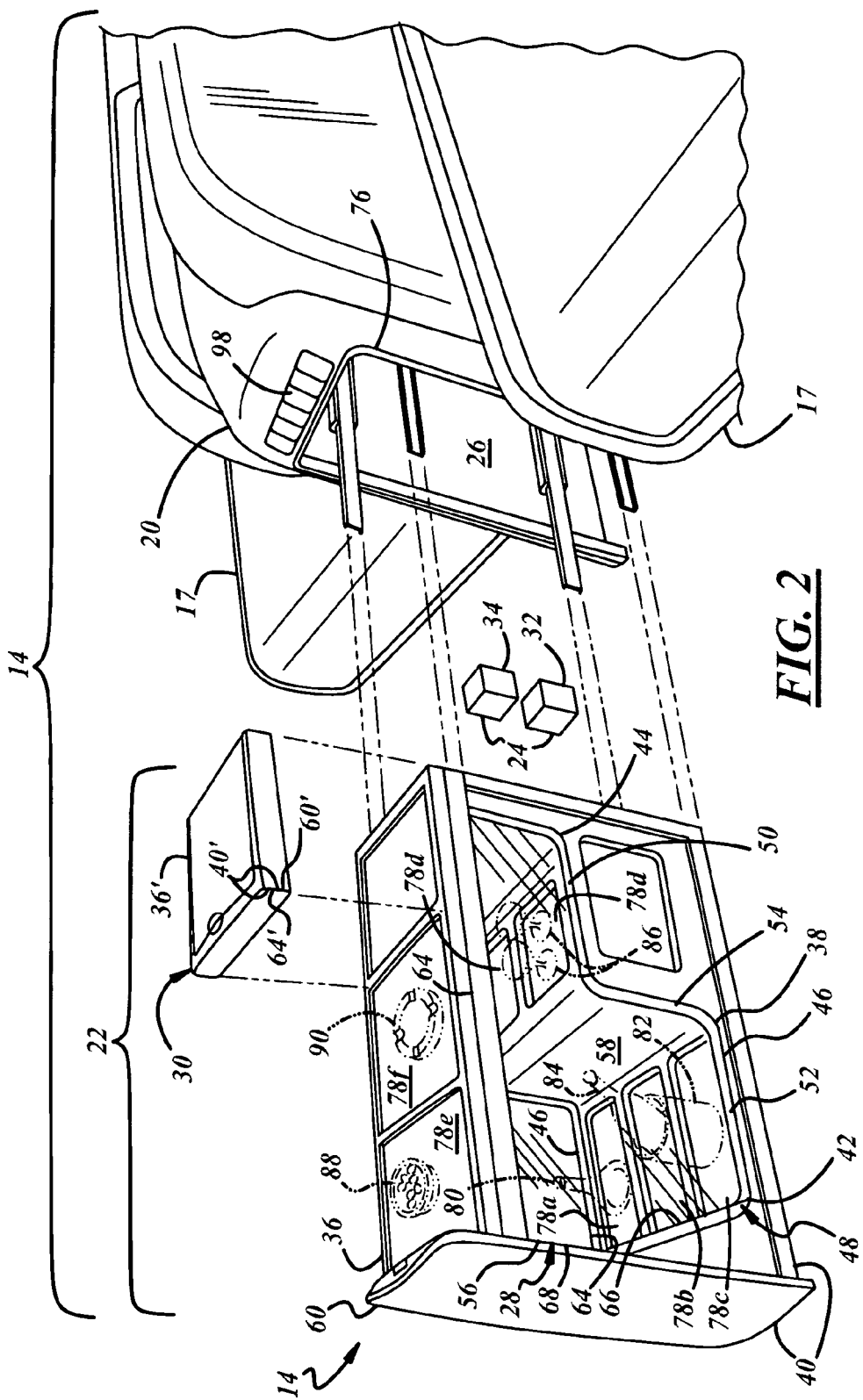
FIG. 2 is an exploded view of the console shown in FIG. 1.
Figure 3:
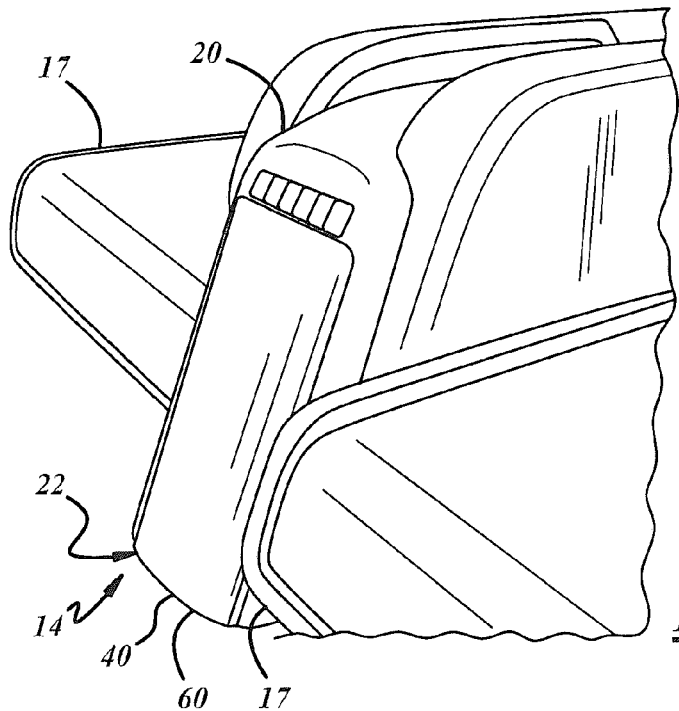
FIG. 3 is a perspective view of the console shown in FIG. 1, illustrating the console in a closed position.
Figure 4:
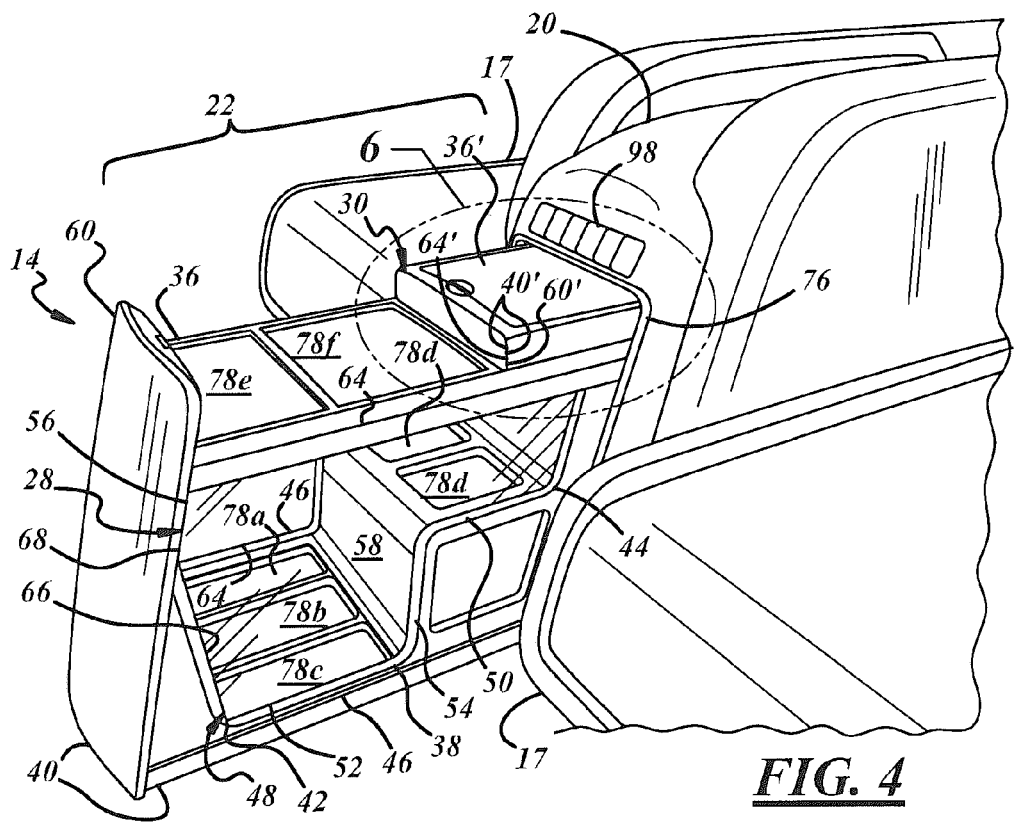
FIG. 4 is a perspective view of the console shown in FIG. 1, illustrating the console in a first open position.
Figure 5:
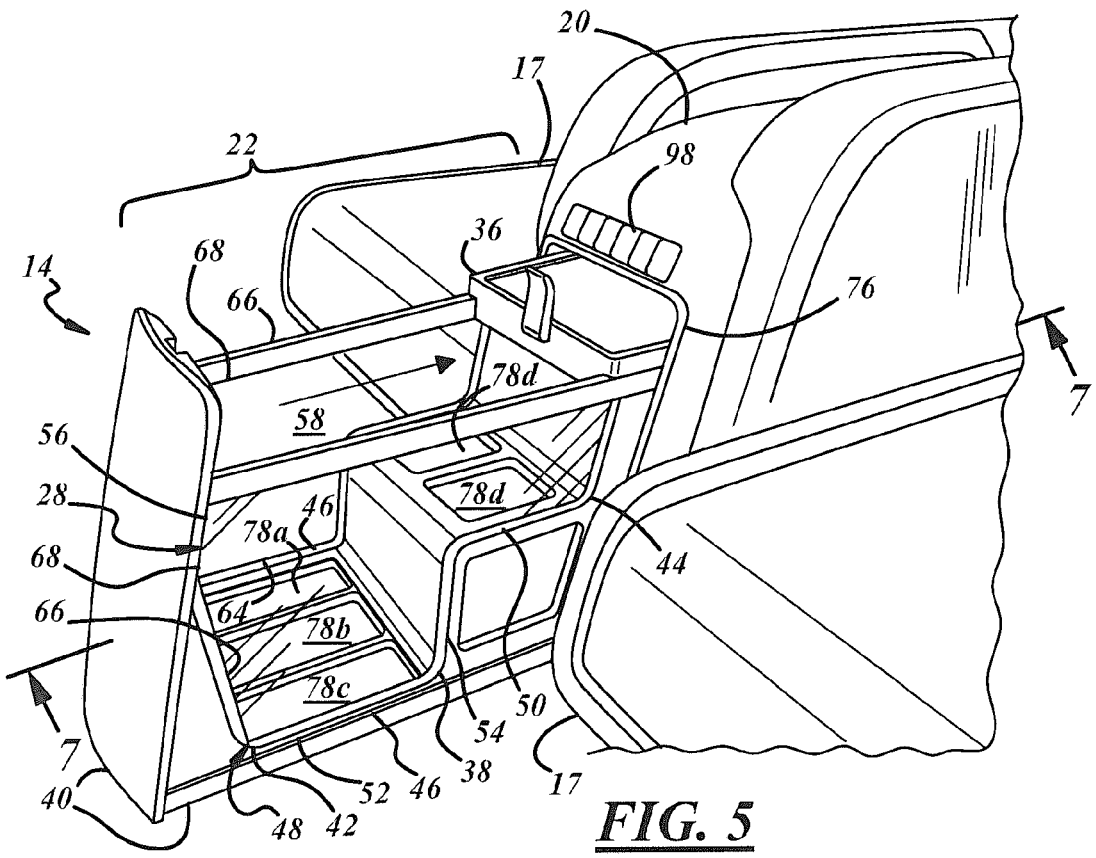
FIG. 5 is a perspective view of the console shown in FIG. 1, illustrating the console in a second open position.
Figure 6:
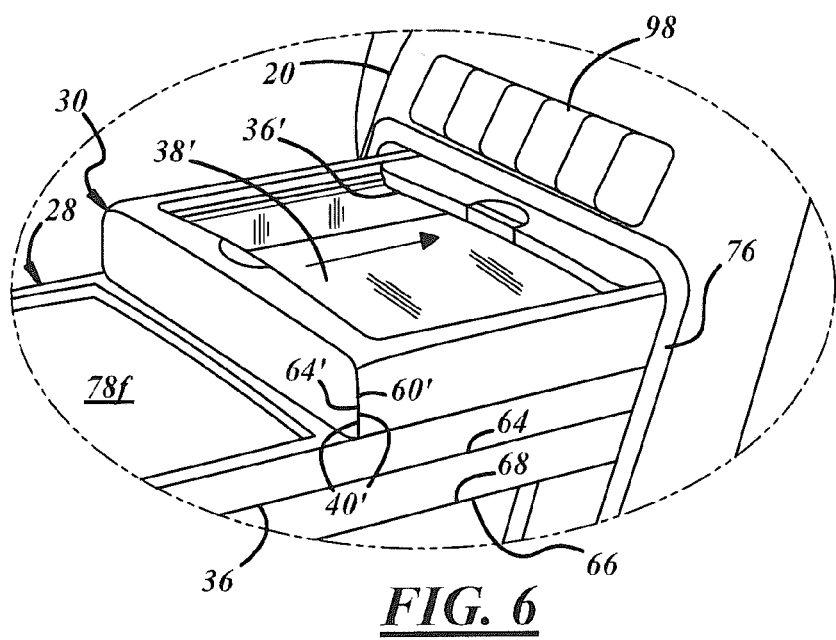
FIG. 6 is an enlarged view of the console shown in FIG. 4, as taken within circle 6, illustrating the console in a third open position.

With attention to FIG. 2, the console 14 includes a housing 20, a drawer 22, and one or more climate regulator devices 24. The housing 20 is attached to the floorpan 16 and defines a cavity 26 for receiving drawer 22. The drawer 22 is slidably attached to housing 20 and movable into cavity 26. As shown in FIGS. 2 through 5, drawer 22 defines a refrigerated compartment 28 and a humidor compartment 30. In the illustrated embodiment, the climate regulator devices 24 include a heat exchanger device 32 and a humidifier device 34 with the heat exchanger device 32 cooling the refrigerated compartment 28 and the humidifier device 34 humidifying the humidor compartment 30. However, it is understood that the climate regulator devices 24 can be various other suitable devices. Drawer 22 is movable between a closed position (as shown in FIG. 3), a first open position (as shown in FIG. 4), a second open position (as shown in FIG. 5), and a third open position (as shown in FIG. 6). It is contemplated that drawer 22 can include more or less than two compartments as desired. It will also be appreciated that the console 14 can include a variety of suitable climate regulator devices 24 as desired.

The refrigerated compartment 28 is defined by a lid 36, a floor portion 38, and a series of wall portions 40 extending between the lid 36 and the floor portion 38. The floor portion 38 includes a front end 42, a rear end 44, and a pair of opposing lateral sides 46. The floor portion 38 has a stepped construction 48 with a first platform 50, a second platform 52, and a rise portion 54 offsetting the second platform 52 lower than the first platform 50. The second platform 52 is adjacent to the front end 42 of the floor portion 38, and the first platform 50 is adjacent to the rear end 44 of the floor portion 38.

One or more of the wall portions 40 is formed from a transparent material 56 for displaying an interior 58 of the refrigerated compartment 28 and the items therein. This feature provides a vehicle occupant with a direct line of sight of the items in the drawer 22 and thus facilitates retrieval of those items. In this respect, the transparent material 56 dispenses with the need for vehicle occupants to peer over an open drawer 22 and search through the items contained therein.

In particular, the wall portions 40 include a front wall portion 60, a rear wall portion 62, and a pair of sidewall portions 64. In the illustrated embodiment, the sidewall portions 64 include a frame portion 66 and a window portion 68. The window portion 68 is formed from polycarbonate. However, it is contemplated that the window portion 68 can instead be formed from a ceramic 70, a poly (methacrylate), or a variety of other suitable transparent materials. The sidewall portions 64 extend from the opposing lateral sides 46 of the floor portion 38.

It is contemplated that the front wall portion 60, the rear wall portion 62, the lid 36, the floor portion 38, and any suitable combination thereof can have the window portion 68 as desired. The front wall portion 60 extends from the front end 42 of the floor portion 38. The rear wall portion 62 extends from the rear end 44 of the floor portion 38.

The lid 36, floor portion 38, and wall portions 40 defining the refrigerator compartment 28 are formed from an insulation material 74 (as shown in FIG. 7). In the illustrated embodiment, the insulation material 74 is polycarbonate. However, it is contemplated that the insulation material 74 can instead be poly (methacrylate), ceramic, or a dewar as desired. Also, the console 14 includes a seal 76 (shown in FIG. 2) that is sandwiched between the drawer 22 and the housing 20, with the drawer 22 in a closed position (as shown in FIG. 3).

The lid 36', the floor portion 38', and wall portions 40' of the humidor compartment 30 are wood panels, such as cedar wood. However, other wood or other suitable materials can be utilized as desired.

Referring to FIG. 7, the heat exchanger device 32 and the humidifying device 34 are attached to the housing 20. However, it is contemplated that the heat exchanger device 32 and/or the humidifying device 34 can instead be attached to the drawer 22, e.g. beneath the first platform 50.

With attention to FIG. 2, the floor portion 38 includes a series of recessed trays 78a, 78b, 78c, and 78d for receiving and holding a variety of items in fixed positions. For instance, recessed trays 78a, 78b, 78c, and 78d can be respectively sized to receive a decanter 80, an ice bucket 82, a champagne bottle 84, and a drinking glass 86.

Lid 36 includes recessed trays 78e, 78f that are sized to receive a peanut dish 88, ashtray 90, or various other suitable items.

Referring back to FIG. 7, the console 14 includes a motor 92, with a threaded rod 94 for moving the drawer 22 between open and closed positions. The motor 92 rotates the threaded rod 94 that receives a race 96 extending from the drawer 22. The motor 92 is actuated by a button switch 98 extending from housing 20.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A vehicle, comprising:
a vehicle frame having a passenger cabin; and
a console attached to said vehicle frame and extending into said passenger cabin;
said console having a housing, a drawer, and at least one climate regulator;
said at least one climate regulator including at least one of a heat exchanger and a humidifier;
said housing defining a cavity;
said drawer slidably attached to said housing and movable into said cavity;
said drawer including at least one compartment with a floor portion, a lid, and a plurality of wall portions extending between said floor portion and said lid;
at least one of said wall portions formed from a transparent material for displaying an interior of said at least one compartment;
said at least one climate regulator maintaining a predetermined climate in said at least one compartment.

2. The vehicle recited in claim 1 wherein said at least one compartment includes a refrigerated compartment and a humidor compartment, with said heat exchanger device cooling said refrigerated compartment and said humidifier device humidifying said humidor compartment.

3. The vehicle recited in claim 2 wherein said floor portion in said refrigerator compartment has a plurality of tray recesses receiving at least one of a decanter, a bottle, an ice receptacle, and a drinking glass.

4. The vehicle recited in claim 1 wherein said floor portion includes a front end, a rear end, and a pair of opposing lateral sides.

5. The vehicle recited in claim 4 wherein said wall portions include a pair of sidewall portions extending from said opposing lateral sides of said floor portion, with said sidewall portions formed from said transparent material.

6. The vehicle recited in claim 4 wherein said floor portion has a stepped construction with a first platform, a second platform, and a rise portion offsetting said second platform lower than said first platform.

7. The vehicle recited in claim 1 wherein said heat exchanger device and said humidifier device are attached to at least one of said housing and said drawer.

8. The vehicle recited in claim 4 wherein said wall portions include a pair of sidewall portions extending from said opposing lateral sides of said floor portion, with said sidewall portions formed from said transparent material.

* * * * *